Patented Feb. 8, 1944

2,340,901

UNITED STATES PATENT OFFICE 2,340,901

TERPENE DERIVATIVE

Alfred L. Rummelsburg, Wilmington, Del., assignor to Hercules Powder Company, Wilmington, Del., a corporation of Delaware No Drawing. Application May 31, 1941,
Serial No. 396,218

17 Claims. (Cl. 260—457)

This invention relates to aromatic sulfonation products and to methods for their production; more particularly, it relates to sulfonation products formed from condensates of acyclic terpenes having three double bonds per molecule with a phenol.

It has been found that when an acyclic terpene having three double bonds per molecule or any of the polymeric modifications thereof, is condensed with a phenol, the resulting condensate may be sulfonated to produce new derivatives which are characterized by their possessing sudsing and wetting-out properties and which may be variously used as emulsifying agents, cleansing agents, wetting agents, etc.

In preparing the condensate referred to above, any acyclic terpene having three double bonds per molecule may be employed. Thus, allo-ocimene, ocimene, myrcene, etc., may be employed. Although any of the aforesaid acyclic terpenes may be employed, preferably allo-ocimene will be employed in accordance with the invention. This particular acyclic terpene, in addition to having three double bonds per molecule, has them in a triply conjugated position. Hereinafter, in this specification an acyclic terpene having three double bonds per molecule will be referred to for convenience merely as an acyclic terpene.

Now, in accordance with this invention either an acyclic terpene or any of its polymeric modifications may be employed. Variously, mixtures containing both the monomeric and the polymeric forms may be employed. To obtain the polymeric form from the monomer, any of the processes known in the art are contemplated. For example, in the case of allo-ocimene, it is desired to include allo-ocimene polymerized with phosphoric acid catalysts, such as, orthophosphoric acid, tetraphosphoric acid, hypophosphoric acid, metaphosphoric acid, pyrophosphoric acid, etc., or with metal halide catalysts, such as, stannic chloride, aluminum chloride, zinc chloride, boron trifluoride and its molecular complexes with ethers and acids, etc. The polymerization may be carried out with or without the use of an inert, volatile, organic solvent, such as, benzene, xylene, gasoline, ethylene dichloride, etc. For additional information relating to the particular procedures employed, see my co-pending applications for United States Letters Patent, Serial No. 370,664, filed December 18, 1940, and Serial No. 370,665, filed December 18, 1940.

When a polymerized acyclic terpene is employed in the processes of this invention, it is preferable to use the substantially pure dimer. This results from the fact that the increased unsaturation of the acyclic terpene dimer, as compared with that of the higher polymers, facilitates condensation. Thus, when polymerization is carried out with a phosphoric acid catalyst, a liquid product is formed comprising a substantial quantity of the dimer. In actual practice, the product will contain from about 75% to about 95% of the dimer, depending upon the conditions of reaction, such as, type of phosphoric acid used, the concentration of catalyst, the particular solvent, temperature of reaction, etc. The thiocyanate value of the product may vary from about 120 to about 240. If desired, after the catalyst has been removed, the substantially pure dimer may be separated from the remaining constituents using reduced pressure distillation. The substantially pure dimer, in the specific case of allo-ocimene, will be found to have the following average characteristics:

Boiling point (4 mm.) °C 142–143
$d_0^{23}$ 0.8654
$n_d^{23}$ 1.503

In carrying out the polymerization of acyclic terpenes with metal halide catalysts, liquid polymers may also be obtained following the procedure as cited in my co-pending application for United States Letters Patent, Serial No. 370,664, filed December 18, 1940; however, by employing particlar metal halides and suitably controlling the conditions of the reaction, solid polymers of acyclic terpenes result. For example, when a metal chloride, and preferably aluminum chloride, is used, generally solid polymers result. These solid polymers are formed when the reaction is carried out over wide ranges of temperature and using various inert solvents. Preferably, however, to form solid polymers, the reaction is carried out at a temperature within the range of from about −35° C. to about 60° C. with the acyclic terpene dissolved in a halogenated organic solvent, such as, ethylene dichloride, etc.

These solid polymers which are prepared by the processes above described contain substantial quantities of polymeric constituents higher than the dimer. It has been determined that these organic solids have at least about 70% of polymeric constituents higher than the dimer. They are further characterized by having lower thiocyanate values than the liquid polymers, the values for the former falling within the range of from about 20 to about 80.

By employing an acyclic terpene or any of its polymeric modifications, as hereinabove described, condensation products may be formed by reaction with any desirable phenolic-type compound. It is contemplated that there be included in this category any hydroxy-aromatic compound in which the hydroxy group is directly attached to an aromatic ring. Hereinafter, in the specification and claims, such a material will be referred to as "a phenol." Thus, monocyclic hydroxy-aromatic compounds may be employed. These compounds comprise monohydric compounds, such as, phenol; dihydric compounds, such as, quinol, catechol, resorcinol, etc.; trihydric compounds, such as, pyrogallol, hydroxy quinol, phloroglucinol, etc. Polycyclic hydroxy-aromatic compounds may be used and these compounds may be mono- or polyhydric, for example, α-naphthol, β-naphthol, the dihydroxy-naphthalenes, etc. Furthermore, halogen substitution products of the foregoing single and poly ring hydroxy-aromatic compounds may be employed, for example, ortho-, meta-, and para-monochlorophenol, the dichlorophenols, the trichlorophenols, the tetrachlorophenols, pentachlorophenol, etc.; also nitrogen substitution products, such as, mononitrophenol, the dinitrophenols, the trinitrophenols, etc. In addition, mono- and polyhydrocarbon substitution products of the foregoing mono- and polycyclic hydroxy-aromatic compounds, for example, the cresols, the xylenols, ethyl phenol, propyl phenol, butyl phenol, isoamylphenol, etc., may be employed.

In carrying out this condensation a catalyst is required for the reaction. Operable catalysts include the acids, such as, p-toluene sulfonic acid, sulfuric acid, hydrochloric acid, phosphoric acid, perchloric acid, hydrofluoric acid, fluoboric acid, acetyl sulfuric acid, chloro-aluminic acid, etc.; metal halides, such as, aluminum trichloride, stannic chloride, boron trifluoride and its molecular complexes with ethers and organic acids, etc.; also phosphorus pentoxide. The amount of catalyst employed should not be greater than about 5.0% by weight based on the acyclic terpene or polymerized acyclic terpene; preferably, the amount employed will be within the range of from about 0.5% to about 2.0% based on the acyclic terpene or polymerized acyclic terpene. If desired, an inert solvent may be used to insure more efficient contact of the reactants.

The condensation reaction is generally exothermic once the reaction has commenced. Normally, in carrying out the reaction, the reactants, together with the catalyst, are heated to the reaction temperature of the mixture. This temperature may vary, depending upon the particular phenol and acyclic terpene employed, between room temperature and about 200° C. However, in some instances, for example, when phenol and a monomeric acyclic terpene are condensed, reaction commences immediately without the addition of heat. In most cases, after the reaction has commenced, no further addition of heat is required. However, it may be desired, after it appears that there is no further reaction taking place as evinced by a fall in temperature of the reaction mixture, to heat the mixture at a temperature within the range of from about 80° C. to about 200° C. to insure complete reaction of the constituents. The catalyst, if one has been used, may be removed, preferably, by water washing. Any inert solvent or unreacted constituents may be removed by any suitable method, preferably, by reduced pressure distillation.

In accordance with this invention, any of the condensates produced as hereinabove described, will be sulfonated by treatment with various sulfonating agents such as chlorosulfonic acid, concentrated or fuming sulfuric acid, sulfur trioxide, acetyl sulfuric acid, etc. As desired, the sulfonation may be carried out with the condensate dissolved in a suitable inert solvent, such as, carbon tetrachloride, ethylene dichloride, dichloroethyl ether, chloroform, etc. The preferred solvents are the organic chlorinated solvents, such as, dichloroethyl ether, ethylene dichloride, ethyl chloride, trichloroethylene, fluoro dichloromethane, difluorochloromethane, tetrachloroethane, pentachloroethane, propylene dichloride, carbon tetrachloride, etc.

In carrying out the sulfonation process, the reactants are contacted, with or without an inert solvent present, at a temperature of from about 0° C. to about 70° C., for a period of from about .25 hour to about 6 hours, and preferably, at a temperature of from about 10° C. to about 35° C., for a period of from about .5 hour to about 2 hours. Temperatures without the ranges previously disclosed and reaction periods without the ranges previously disclosed may be employed, if desired, but such operation is less satisfactory. Desirably, agitation will be employed. When an inert solvent is employed for the reactants, the amount of sulfonating agent used will vary from between about 10% and about 200% of the weight of the condensate used, preferably between about 30% and about 60% of the weight of the condensate. However, when an inert solvent is not employed, a liquid sulfonating agent is required. Also larger quantities of sulfonating agent are required, since it must act as a solvent for the condensate. Under these conditions it is preferred to add the condensate slowly to the sulfonating agent.

From this point, different procedures are employed in obtaining the desired product from the reaction mixture depending upon whether or not an inert solvent has been employed in the reaction. Where an inert solvent has been employed, the reaction mixture is neutralized with an inorganic base, such as, NaOH, KOH, NH$_4$OH, Ca(OH)$_2$, Na$_2$CO$_3$, etc., or an organic base, such as, aniline, pyridine, quinoline, triethanolamine, etc. In the case of the inorganic base, an aqueous solution, preferably containing from 20% to 60% base, is employed for the neutralization. Following neutralization, the inert solvent is removed by distillation, preferably in vacuo. The product may be dried in this way also, it being necessary, however, to employ temperatures below 150° C. to prevent decomposition. This product is a metal or organic salt of the sulfonate which was first formed. Any inorganic salt impurities may be removed from the product by the use of a solvent in which the impurities are insoluble.

Sometimes, where an inert solvent is employed during the sulfonation of a condensation product of an acyclic terpene or a polymerized acyclic terpene with a phenol, two phases separate after the neutralization with an aqueous solution of an inorganic base. The phase containing the inert solvent will also contain the neutralized sulfonate, and this phase may be separated from the aqueous phase prior to evaporation of the solvent. It is believed that this separation into two phases during neutralization occurs when the concentration of sulfonate in the inert solvent is low.

If an inert solvent has not been employed for the reactants during sulfonation, the reaction mixture may be treated to remove unreacted sulfonating agent by adding water, preferably accompanied by agitation and cooling. It is also preferred that the dilution with water be such that the strength of the sulfonating agent in the resulting solution will be within the range of from about 30% to about 60%. The precipitated sulfonate can then be separated from the aqueous acid solution in which the sulfonate is only slightly soluble. The sulfonate can be washed with an aqueous inorganic salt solution having a concentration with respect to the salt of from 10% to 20%. Thus, aqueous NaCl, Na$_2$SO$_4$, NaNO$_3$, etc., may be employed. In such a salt solution, the sulfonate is substantially insoluble. If desired, the small amount of sulfonate remaining in the aqueous solution of the sulfonating agent may be precipitated by adding a quantity of the aforementioned inorganic salts. After the sulfonate has thus been isolated, it may be dissolved in water and the solution treated with any of the aforementioned inorganic or organic bases to produce the corresponding salts.

It will be realized from a consideration of the above processes that to obtain the sulfonate, it is required that the sulfonation be carried out without the use of an inert solvent, whereas if a salt of the sulfonate is desired, it may be obtained whether or not an inert solvent has been employed.

As an alternative procedure, in place of the methods of this invention hereinbefore described, it is possible to simultaneously condense and sulfonate a desired phenol and a monomeric or polymeric acyclic terpene. For instance, a mixture of phenol and allo-ocimene may be treated with sulfonating agents under the conditions previously described for treating an allo-ocimene-phenol condensate with a sulfonating agent.

What has heretofore been described as a "sulfonate," will be found to comprise a mixture of what is technically a sulfonate and a sulfate. Substantially more of the sulfonate will, however, be present. Different proportions of these compounds may be present depending upon the sulfonating agent employed, the conditions of the reaction, etc. Technically, a sulfonate will result as a consequence of substitution in the aromatic portion of the condensate employed by the splitting off of H$_2$O, HCl, etc., as determined by the particular sulfonating agent used. Whereas, a sulfate can result as a consequence of an addition reaction at ethylenic double bonds present in the acyclic terpene portion of the condensate. In either instance, there is, in the resulting unneutralized product, a replaceable hydrogen atom. Hence, these products may be described as free acids. For convenience, wherever in this specification and claims the term "sulfonate" is employed there is contemplated the product resulting from the treatment of an acyclic terpene-phenol condensate or a condensation product of a phenol and a polymerized acyclic terpene, with any of the sulfonating agents previously described. Also, wherever, "sulfonation product" is employed, there is contemplated a term comprehensive to "sulfonate" as well as to derivatives thereof, such as, the alkali metal salts, etc.

The alkali metal and ammonium salts of the sulfonates prepared in accordance with this invention are water-soluble and preparation may be accomplished by neutralizing the sulfonates with an aqueous solution of alkali metal or ammonium in the form of hydroxide, carbonate, etc. Organic base salts may be also formed by employing such organic bases as, for example, heterocyclic nitrogen compounds, as pyridine, quinoline, etc.; aliphatic amines, as methylamine, ethylamine, triethylamine, etc.; aliphatic alkylolamines, as, triethanolamine, etc.; aromatic amines, as, aniline, naphthylamine, ethyl aniline, etc.

The procedure in accordance with this invention for the production of sulfonated derivatives of a condensation product of either a monomeric or polymeric acyclic terpene with a phenol is illustrated more specifically in the particular embodiments to follow. All parts and percentages are by weight unless otherwise indicated.

*Example 1*

To 261 parts of monomeric allo-ocimene (60% pure) were added 150 parts of a cresol consisting of the ortho-, meta- and para-isomers, in the presence of 3 parts of p-toluene sulfonic acid. Reaction took place without the application of heat. The mixture was allowed to stand for 3 hours, then heated to 200° C. under reflux for a period of 1 hour. Steam distillation followed by washing with water and drying left 280 parts of condensate having a color of M on the rosin scale. One hundred parts of this residue, dissolved in 300 parts of carbon tetrachloride, were treated with 40 parts of chlorosulfonic acid at 25–27° C. for 4 hours. The mixture was neutralized with an aqueous 20% caustic soda solution. The carbon tetrachloride was removed by distillation and the residue dried at 100° C. The dried ground residue was a light-colored powder. A water-solution of this material exhibited sudsing and wetting-out properties.

*Example 2*

A condensation product of polymerized allo-ocimene, consisting substantially entirely of the dimer, and a cresol was prepared by condensing 142 parts of cresol, consisting of the ortho-, meta-, para-varieties, with 140 parts of polymerized allo-ocimene in the presence of 3 parts of p-toluene sulfonic acid. The reaction was exothermic. When the temperature of the mixture began to drop, the mixture was heated to 200° C. but no further action was apparent. The reaction mixture was steam distilled, water washed and dried to yield 197 parts of condensate. To 100 parts of this condensate, dissolved in 300 parts of carbon tetrachloride, were added 52 parts of chlorosulfonic acid. The mixture was kept at 1 to 5° C. for 3 hours, then neutralized with 125 parts of an aqueous 20% sodium hydroxide solution. The mixture was distilled to remove the solvent and the residue then dried to yield 161 parts of product which had sudsing and wetting-out properties. The product acted as an emulsificant for pine oil in water. When ground, the product was a light-colored powder.

*Example 3*

A condensation product was prepared in accordance with the process of Example 1 by employing 272 parts of monomeric allo-ocimene (98% pure), 190 parts of phenol and 3 parts of p-toluene sulfonic acid. To 100 parts of this condensate, dissolved in 300 parts of carbon tetrachloride, were added 40 parts of chlorosulfonic acid and the mixtlure heated at 25 to 27° C. for 4 hours. The mixture was neutralized with 20% caustic soda solution. The carbon tetrachloride was removed by distillation and the residue dried at 100° C. The dried, ground residue was a light-colored powder, the water-solution of which exhibited foaming and wetting-out properties.

Example 4

A condensation product was prepared in the manner of Example 1 by employing 272 parts of monomeric allo-ocimene (98% pure), 270 parts of monochlorophenol and 3 parts of p-toluene sulfonic acid. To 100 parts of this condensate, dissolved in 300 parts of carbon tetrachloride, were added 52 parts of chlorosulfonic acid. The mixture was kept at 1 to 5° C. for 3 hours, then neutralized with 125 parts of 20% sodium hydroxide. The mixture was distilled to remove the solvent and the residue, then dried. The product had sudsing and wetting-out properties and acted as an emulsificant for pine oil in water. The product when ground was a light-colored powder.

Example 5

To 100 parts of a condensation product of monomeric allo-ocimene with α-naphthol were added 400 parts of 102% $H_2SO_4$ with agitation at 25 to 40° C. The mixture was agitated for 4 hours at 50° C., then cooled to 10° C. and diluted with 400 parts of water with agitation and cooling such that the temperature was maintained between 20° C. and 40° C. The precipitated sulfonated condensate was separated from the aqueous solution and washed with 600 parts of aqueous 10% NaCl. The sulfonated condensate was then dissolved in 600 parts of water and neutralized with sodium hydroxide using phenolphthalein as indicator. The sodium salt of the sulfonate was precipitated by adding 100 parts of NaCl, was filtered off, and dried at 100° C. under vacuo. The dried material when ground was a light-colored powder having emulsifying, wetting-out, and detersive properties.

Example 6

One hundred parts of a condensation product of dimeric allo-ocimene with α-naphthol was dissolved in 300 parts of carbon tetrachloride. Gaseous sulfur trioxide was introduced into the solution and over a period of 30 minutes, 30 parts of sulfur trioxide were absorbed. The reaction mixture was agitated and cooled to maintain a temperature of 20° C. during this period. Agitation was continued for an additional period of 3 hours at from 20 to 30° C. The reaction mixture was then neutralized with 130 parts of a 50% aqueous solution of triethanolamine with stirring and cooling to maintain a temperature of 20° C. The carbon tetrachloride was removed by distillation at a temperature below 100° C. Moisture was removed from the product by further heating under vacuo for a period of 10 hours at 90° C. The dried, ground product was a light-colored powder, having emulsifying and wetting-out properties.

The sulfonates and their alkali and ammonium salts prepared in accordance with this invention have important industrial applications inasmuch as they have sudsing, wetting-out, emulsifying, and detergent properties. They may also be used as dispersing agents for various water-insoluble liquids and solids. These sulfonates and their water-soluble salts are particularly important in the processing of textiles and leather, inasmuch as they accomplish the emulsification with water of terpene alcohols, pine oil, octyl alcohol, cyclohexanol, lauryl alcohol, etc., all of which are water-insoluble.

It will be appreciated that the methods in accordance with this invention are not limited to any particular mode of procedure as shown in the various examples but involve broadly the treatment of a condensation product of a monomeric or polymeric acyclic terpene and a phenol with a sulfonating agent. The proportions of reactants, the amounts, if any, of solvent used, the temperature and the time of reaction may be widely varied to produce a material having the properties desired.

This application constitutes a continuation-in-part of my application for United States Letters Patent, Serial No. 381,987, filed March 6, 1941.

What I claim and desire to protect by Letters Patent is:

1. A sulfonation product comprising the mixture of a sulfonate and a sulfate obtained by sulfonating a condensation product of a phenol with a material selected from the group consisting of the monomers and polymers of acyclic terpene having three double bonds per molecule, at a temperature within the range of from about 0° C. to about 70° C.

2. A sulfonation product comprising the mixture of a sulfonate and a sulfate obtained by sulfonating a condensation product of a phenol with an acyclic terpene having three double bonds per molecule, at a temperature within the range of from about 0° C. to about 70° C.

3. A sulfonation product comprising the mixture of a sulfonate and a sulfate obtained by sulfonating a condensation product of a phenol with allo-ocimene, at a temperature within the range of from about 0° C. to about 70° C.

4. A sulfonation product comprising the mixture of a sulfonate and a sulfate obtained by sulfonating a condensation product of a monocyclic phenol with allo-ocimene, at a temperature within the range of from about 0° C. to about 70° C.

5. A sulfonation product comprising the mixture of a sulfonate and a sulfate obtained by sulfonating a condensation product of a polycyclic phenol with allo-ocimene, at a temperature within the range of from about 0° C. to about 70° C.

6. A sulfonation product comprising the mixture of a sulfonate and a sulfate obtained by sulfonating a condensation product of phenol with allo-ocimene, at a temperature within the range of from about 0° C. to about 70° C.

7. A sulfonation product comprising the mixture of a sulfonate and a sulfate obtained by sulfonating a polycyclic monohydroxy phenol of the naphthalene series with allo-ocimene, at a temperature within the range of from about 0° C. to about 70° C.

8. A sulfonation product comprising the mixture of a sulfonate and a sulfate obtained by sulfonating a condensation product of naphthol with allo-ocimene, at a temperature within the range of from about 0° C. to about 70° C.

9. A sulfonation product comprising the mixture of a sulfonate and a sulfate obtained by sulfonating a condensation product of a phenol with a polymer of an acyclic terpene having three double bonds per molecule, at a temperature within the range of from about 0° C. to about 70° C.

10. A sulfonation product comprising the mixture of a sulfonate and a sulfate obtained by sulfonating a condensation product of a phenol with polymerized allo-ocimene, at a temperature within the range of from about 0° C. to about 70° C.

11. A sulfonation product comprising the mixture of a sulfonate and a sulfate obtained by sulfonating a condensation product of a monocyclic phenol with polymerized allo-ocimene, at a temperature within the range of from about 0° C. to about 70° C.

12. A sulfonation product comprising the mixture of a sulfonate and a sulfate obtained by sulfonating a condensation product of phenol with dimeric allo-ocimene, at a temperature within the range of from about 0° C. to about 70° C.

13. The method of producing a sulfonation product having high wetting-out, sudsing and emulsifying properties comprising a mixture of a sulfonate and a sulfate which comprises sulfonating a condensation product of a phenol and a material selected from the group consisting of the monomers and polymers of acyclic terpenes having three double bonds per molecule, at a temperature within the range of from about 0° C. to about 70° C.

14. The method of producing a sulfonation product having high wetting-out, sudsing and emulsifying properties comprising a mixture of a sulfonate and a sulfate which comprises sulfonating a condensation product of a phenol and a material selected from the group consisting of the monomers and polymers of acyclic terpenes having three double bonds per molecule, dissolved in an inert solvent, at a temperature within the range of from about 0° C. to about 70° C.

15. The method of producing a sulfonation product having high wetting-out, sudsing and emulsifying properties comprising a mixture of a sulfonate and a sulfate which comprises sulfonating a condensation product of a phenol and a material selected from the group consisting of the monomers and polymers of acyclic terpenes having three double bonds per molesule, dissolved in an inert solvent, at a temperature within the range of from about 10° C. to about 35° C.

16. The method of producing a sulfonation product having high wetting-out, sudsing and emulsifying properties comprising a mixture of a sulfonate and a sulfate which comprises reacting with chlorosulfonic acid a condensation product of a phenol and a material selected from the group consisting of the monomers and polymers of acyclic terpenes having three double bonds per molecule, dissolved in an inert solvent, at a temperature within the range of from about 0° C. to about 70° C.

17. The method of producing a sulfonation product having high wetting-out, sudsing and emulsifying properties comprising a mixture of a sulfonate and a sulfate which comprises reacting with sulfuric acid a condensation product of a phenol and a material selected from the group consisting of the monomers and polymers of acyclic terpenes having three double bonds per molecule, dissolved in an inert solvent, at a temperature within the range of from about 0° C. to about 70° C.

ALFRED L. RUMMELSBURG.